(12) United States Patent
Miller et al.

(10) Patent No.: US 10,559,086 B1
(45) Date of Patent: Feb. 11, 2020

(54) SYSTEM FOR VOLUME DIMENSIONING VIA HOLOGRAPHIC SENSOR FUSION

(71) Applicant: 4DMobile, LLC, Hiawatha, IA (US)

(72) Inventors: Matthew D. Miller, Cedar Rapids, IA (US); Steven R. Kunert, Cedar Rapids, IA (US); Craig McDermott, Cedar Rapids, IA (US); Josh Berry, Cedar Rapids, IA (US); Mark Boyer, Cedar Rapids, IA (US)

(73) Assignee: 4DMobile, LLC, Hiawatha, IA (US)

( * ) Notice: Subject to any disclaimer, the term of this patent is extended or adjusted under 35 U.S.C. 154(b) by 0 days.

(21) Appl. No.: 16/390,562

(22) Filed: Apr. 22, 2019

Related U.S. Application Data

(63) Continuation-in-part of application No. 15/156,149, filed on May 16, 2016, now Pat. No. 10,268,892.

(Continued)

(51) Int. Cl.
*G06Q 10/00* (2012.01)
*G06T 7/62* (2017.01)
*G06T 7/593* (2017.01)
*H04N 5/225* (2006.01)
*H04N 5/445* (2011.01)
*G06F 3/0488* (2013.01)

(Continued)

(52) U.S. Cl.
CPC ............... *G06T 7/62* (2017.01); *G06F 3/017* (2013.01); *G06F 3/0488* (2013.01); *G06F 3/04815* (2013.01); *G06F 3/04845* (2013.01); *G06F 3/167* (2013.01); *G06K 7/1408* (2013.01); *G06T 7/593* (2017.01); *G06T 19/006* (2013.01);

(Continued)

(58) Field of Classification Search
CPC ... G06F 1/162; G06K 7/10663; G06Q 10/087
See application file for complete search history.

(56) References Cited

U.S. PATENT DOCUMENTS 5,117,098 A * 5/1992 Swartz ............... G06K 7/10861
235/462.21
5,329,106 A * 7/1994 Hone .................. G06K 7/10891
235/462.44

(Continued)

OTHER PUBLICATIONS

Toward scalable System for Big data analytics; Hu et al; Apr. 2014 (Year: 2014).*

(Continued)

*Primary Examiner* — Luis Perez-Fuentes
(74) *Attorney, Agent, or Firm* — Suiter Swantz pc llo

(57) ABSTRACT

A system for volume dimensioning via two-dimensional (2D)/three-dimensional (3D) sensor fusion, based in a tablet, phablet, or like mobile device, is disclosed. The mobile device includes a 2D imager for capturing an image stream of its field of view (FOV), the FOV including target objects. The mobile device includes a 3D imager for collecting 3D imaging data of the FOV including point clouds of each target object within the FOV. Processors of the mobile device positively identify a particular target object by correlating the 2D and 3D image streams and generating a holographic model of the target object overlaid on the video stream, with adjustable surface, edge, and vertex guides. The processors determine the precise dimensions of the target object by measuring the holographic model, and detect and decode object identifiers (2D or 3D) on the surface of the target object to acquire and supplement object data.

20 Claims, 12 Drawing Sheets

Related U.S. Application Data

(60) Provisional application No. 62/162,480, filed on May 15, 2015, provisional application No. 62/694,764, filed on Jul. 6, 2018.

(51) Int. Cl.
    *G06F 3/16*     (2006.01)
    *G06T 19/00*     (2011.01)
    *G06F 3/01*     (2006.01)
    *G06F 3/0481*     (2013.01)
    *G06K 7/14*     (2006.01)
    *G06F 3/0484*     (2013.01)

(52) U.S. Cl.
    CPC ....... *H04N 5/2258* (2013.01); *H04N 5/44504* (2013.01); *G06T 2200/04* (2013.01); *G06T 2200/08* (2013.01)

(56) References Cited

U.S. PATENT DOCUMENTS

| | | |
|---|---|---|
| 6,947,571 B1 | 9/2005 | Rhoads et al. |
| 8,239,229 B1 | 8/2012 | Paiz |
| 8,755,837 B2 | 6/2014 | Rhoads et al. |
| 8,775,710 B1 * | 7/2014 | Miller .................. G06F 1/1626 361/679.17 |
| 9,332,243 B2 | 5/2016 | Klusza et al. |
| 9,464,885 B2 | 10/2016 | Lloyd et al. |
| 10,268,892 B1 * | 4/2019 | Miller .................. H04B 1/3888 |
| 10,448,000 B2 | 10/2019 | Klusza et al. |
| 2002/0014533 A1 | 2/2002 | Zhu et al. |
| 2004/0023444 A1 | 2/2004 | Rhoads |
| 2004/0190092 A1 | 9/2004 | Silverbrook et al. |
| 2009/0267895 A1 | 10/2009 | Bunch |
| 2012/0268606 A1 | 10/2012 | Liu |
| 2013/0273968 A1 | 10/2013 | Rhoads et al. |
| 2014/0225985 A1 | 8/2014 | Klusza et al. |

OTHER PUBLICATIONS

Internet NPL search log (Year: 2019).*
Hu, Han et al., "Toward Scalable Systems for Big Data Analytics: A Technology Tutorial", IEEE Access, vol. 2, Published Jun. 24, 2014, Digital Object Identifier 10.1109/Access 2014.2332453, pp. 652-687.

* cited by examiner

US 10,559,086 B1

SYSTEM FOR VOLUME DIMENSIONING VIA HOLOGRAPHIC SENSOR FUSION

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

RELATED APPLICATIONS

U.S. patent application Ser. No. 15/156,149 entitled SYSTEM AND METHODS FOR VOLUME DIMENSIONING FOR SUPPLY CHAINS AND SHELF SETS, filed May 16, 2016;

U.S. Provisional Patent Application Ser. No. 62/162,480 entitled SYSTEMS AND METHODS FOR COMPREHENSIVE SUPPLY CHAIN MANAGEMENT VIA MOBILE DEVICE, filed May 15, 2015;

and U.S. Provisional Patent Application Ser. No. 62/694,764 entitled SYSTEM FOR VOLUME DIMENSIONING VIA 2D/3D SENSOR FUSION, filed Jul. 6, 2018.

Said U.S. patent application Ser. No. 15/156,149; 62/162,480; and 62/694,764 are herein incorporated by reference in their entirety.

BACKGROUND

While many smartphones, pads, tablets, and other mobile computing devices are equipped with front-facing or rear-facing cameras, these devices may now be equipped with three-dimensional imaging systems incorporating cameras configured to detect infrared radiation combined with infrared or laser illuminators (e.g., light detection and ranging (LIDAR) systems) to enable the camera to derive depth information. It may be desirable for a mobile device to capture 3D images of objects, or two-dimensional images with depth information, and derive from the captured imagery additional information about the objects portrayed, such as the dimensions of the objects or other details otherwise accessible through visual comprehension, such as significant markings, encoded information, or visible damage.

SUMMARY

An apparatus for volume dimensioning via two-dimensional (2D)/three-dimensional (3D) sensor fusion is disclosed. In embodiments, the apparatus has a housing portable by a user or operator. The apparatus includes (within the housing) two-dimensional (2D) cameras or imaging systems for capturing a video or image stream of its field of view (FOV), the FOV including one or more target objects to be dimensioned. The apparatus includes a three-dimensional (3D) imager for collecting 3D imaging data of an identical or substantially similar FOV; the 3D imaging data includes point clouds or sets for each potential target object within the FOV, each point having at least a coordinate set relative to the FOV and a distance from the apparatus. The housing includes one or more processors in communication with the 2D and 3D imagers; the processors positively identify or "lock onto" a particular target object or objects by analyzing the 2D and 3D image streams. The processors generate a holographic model of the target object by correlating the 2D and 3D image data, such that the holographic model is overlaid on the video stream, with adjustable surface, edge, and vertex guides corresponding to the identified parameters of the target object. The processors determine the precise dimensions of the target object by measuring the holographic model, e.g., sets of parallel edges corresponding to each of the three dimensions of the target object. The processors can detect and decode object identifiers on the surface of the target object (e.g., 2D encoded information such as barcodes and QR codes or 3D encoding integrated into the surface of the target object) to acquire and supplement object data particular to the target object (e.g., unique identifiers, chain of custody information). The apparatus includes a touch-sensitive display surface for displaying the image streams and overlaying the holographic model thereon. The display surface receives control input from the operator and can adjust the displayed holographic model based on the control input. The apparatus includes a wireless transceiver for wirelessly linking the apparatus to remotely located users (e.g., who may manipulate the displayed image streams or holographic model by submitting control input at their location).

A system for remote volume dimensioning via 2D/3D sensor fusion is also disclosed. In embodiments, the volume dimensioning system includes a mobile computing or communications device (e.g., tablet, phablet, or similar device) and a wearable device wirelessly linked to the mobile device, e.g., an augmented reality (AR), virtual reality (VR), or mixed reality (MR) device worn by an operator. The mobile device includes (within a housing) two-dimensional (2D) cameras or imaging systems for capturing a video or image stream of its field of view (FOV), the FOV including one or more target objects to be dimensioned. The mobile device includes a three-dimensional (3D) imager includes for collecting 3D imaging data of an identical or substantially similar FOV; the 3D imaging data includes point clouds or sets for each potential target object within the FOV, each point having at least a coordinate set relative to the FOV and a distance from the apparatus. The mobile device includes one or more processors in communication with the 2D and 3D imagers; the processors positively identify or "lock onto" a particular target object or objects by analyzing the 2D and 3D image streams. The processors generate a holographic model of the target object by correlating the 2D and 3D image data, such that the holographic model is overlaid on the video stream, with adjustable surface, edge, and vertex guides corresponding to the identified parameters of the target object. The processors determine the precise dimensions of the target object by measuring the holographic model, e.g., sets of parallel edges corresponding to each of the three dimensions of the target object. The processors can detect and decode object identifiers on the surface of the target object (e.g., 2D encoded information such as barcodes and QR codes or 3D encoding integrated into the surface of the target object) to acquire and supplement object data particular to the target object (e.g., unique identifiers, chain of custody information). The mobile device further includes a touch-sensitive display surface for displaying the image streams and overlaying the holographic model thereon. The display surface receives control input from the operator and can adjust the displayed holographic model based on the control input. The mobile device includes a wireless transceiver for wirelessly linking the apparatus to remotely located users (e.g., who may manipulate the displayed image streams or holographic model by submitting control input at their location. The AR/VR/MR viewing device is in communication with the mobile device and displays the image stream and holographic model to the viewer via a wearable surface, e.g., goggles worn by the operator proximate to his/her eyes. The viewing device similarly superimposes or overlays the holographic model onto the image stream and detects control input from the operator, e.g., gestures within the field of view of the viewing device corresponding to specific display commands, changes in gaze, or audio commands submitted by the operator and detected by a microphone. Based on the control input, the viewing device adjusts the holographic model displayed to the operator and performs other volume dimensioning or processing routines otherwise executable via the mobile device.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
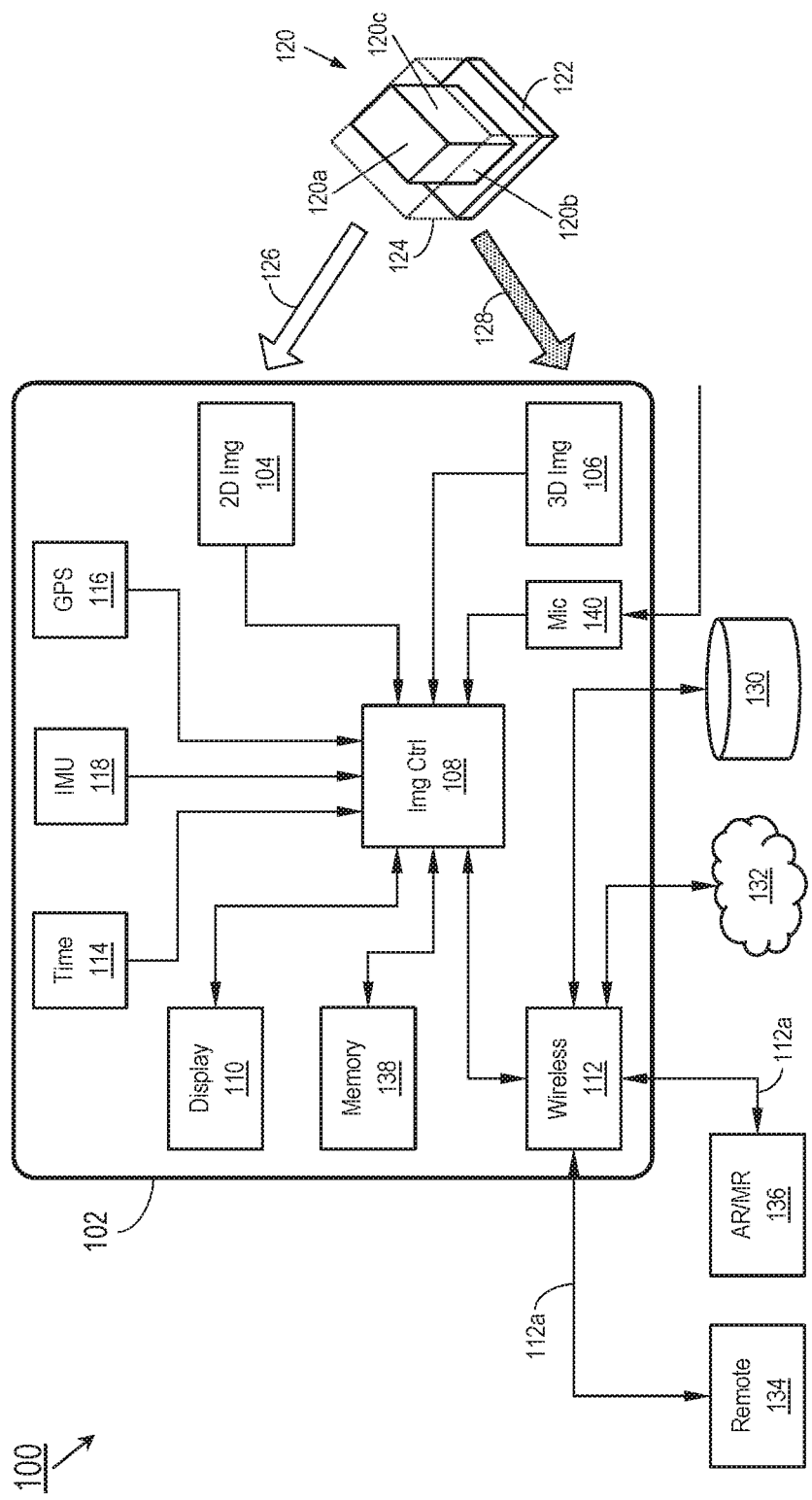
FIG. 1 is a block diagram illustrating a system for volume dimensioning via sensor fusion, in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A system for volume dimensioning via sensor fusion is disclosed. In embodiments, the volume dimensioning system includes two-dimensional (2D) and three-dimensional (3D) image sensors incorporated into or attached to a mobile device, e.g., a smartphone, tablet, phablet, or like portable processor-enabled device. The 2D imager captures an image stream or sequence (e.g., streaming video at 30 or 60 fps) corresponding to a field of view of the device, while the 3D imager creates a point cloud or similar point set (e.g., a 3D mesh representation) of the field of view. The image sources can be fused to detect a target object within the field of view (e.g., a shipping container or like cuboid object traveling through a supply chain). By analyzing the fused imagery, the target object can be accurately measured and any encoded information relevant to the object decoded and updated Referring to FIG. 1, a system 100 for volume dimensioning via sensor fusion is disclosed. The volume dimensioning system 100 may include a mobile device 102 capable of being carried by an operator or user, the mobile device 102 including 2D image sensors 104 (e.g., a visible-light camera), 3D image sensors 106, image and control processors 108, a touch-sensitive display surface 110, and a wireless transceiver 112. The mobile device 102 may additionally include a clock 114 or time sensor, a Global Positioning System (GPS) receiver 116 or similar position sensor for determining a current position of the mobile device, and an inertial measurement unit 118 (IMU) or similar inertial sensor (e.g., accelerometer, magnetometer, gyrometer, compass) for determining a current orientation of the mobile device (or for tracking the orientation, and the rate of change thereof, over time). Instead of, or in addition to, onboard IMUs 118 of the mobile device 102, the volume dimensioning system 100 may incorporate IMUs integrated into the 2D image sensors 104 or into the 3D image sensors 106. The 3D image sensors 106 may include imaging systems including infrared illuminators combined with multiple embedded cameras (e.g., Intel RealSense or other like triangulating systems), laser-based light detection and ranging (LIDAR) systems incorporating onboard photodetectors to track reflected beams, time of flight (ToF) camera systems, or any other like sensor system capable of producing 3D spatial information of proximate objects. As noted above, the 3D image sensors 106 may incorporate inertial or orientation sensors or combinations thereof, e.g., accelerometers, gyroscopes, and compasses.

In embodiments, the mobile device 102 may be oriented toward a target object 120 in such a way that the 2D image sensors 104 and 3D image sensors 106 simultaneously capture image data from a common field of view in which the target object 120 is situated. For example, the target object 120 may include a shipping box or container currently traveling through a supply chain, e.g., from a known origin to a known destination. The target object 120 may be freestanding on a floor, table, or other flat surface; in some embodiments the target object may be secured to a pallet 122 or similar structural foundation, either individually or in a group of such objects, for storage or transport. The target object 120 is preferably substantially cuboid in shape, e.g., having six rectangular surfaces (120a-c) intersecting at right angles. In embodiments, the target object 120 may not itself be perfectly cuboid but may fit perfectly within a minimum cuboid volume 124 of determinable dimensions (e.g., the minimum cuboid volume necessary to fully surround or encompass the target object). In embodiments, the precise dimensions of the target object 120 may be unknown to the operator of the mobile device 102 but determinable via sensor fusion of the respective sensor inputs 126, 128 of the 2D imager 104 and 3D imager 106.

In embodiments, the volume dimensioning system 100 may detect the target object 120 via a single sensor array, e.g., either the 2D image sensors 104 or the 3D image sensors 106, as opposed to a combination of 2D and 3D image sensors fusing their respective data outputs to aid detection. Similarly, the volume dimensioning system 100 may simultaneously detect and analyze multiple target objects 120 within a particular field of view.

In embodiments, the wireless transceiver 112 may enable the establishment of wireless links to remote sources, e.g., physical servers 130 and cloud-based storage 132. For example, the wireless transceiver 112 may establish a wireless link 112a to a remote operator 134 situated at a physical distance from the mobile device 102 and the target object 120, such that the remote operator may visually interact with the target object 120 and submit control input to the mobile device 102. Similarly, the wireless transceiver 112 may establish a wireless link 112a to an augmented reality (AR) viewing device 136 (e.g., a virtual reality (VR) or mixed reality (MR) device worn on the head of a viewer, or proximate to the viewer's eyes, and capable of displaying to the viewer real-world objects and environments, synthetic objects and environments, or combinations thereof). For example, the AR viewing device 136 may allow the user to interact with the target object 120 and/or the mobile device 102 (e.g., submitting control input to manipulate the field of view, or a representation of the target object situated therein) via physical, ocular, or aural control input detected by the AR viewing device.

In embodiments, the mobile device 102 may include a memory 138 or other like means of data storage accessible to the image and control processors 108, the memory capable of storing reference data accessible to the volume dimensioning system 100 to make additional determinations with respect to the target object 120.

In embodiments, the mobile device 102 may include a microphone 140 for receiving aural control input from the user/operator, e.g., verbal commands to the volume dimensioning system 100.

Figure 2A:
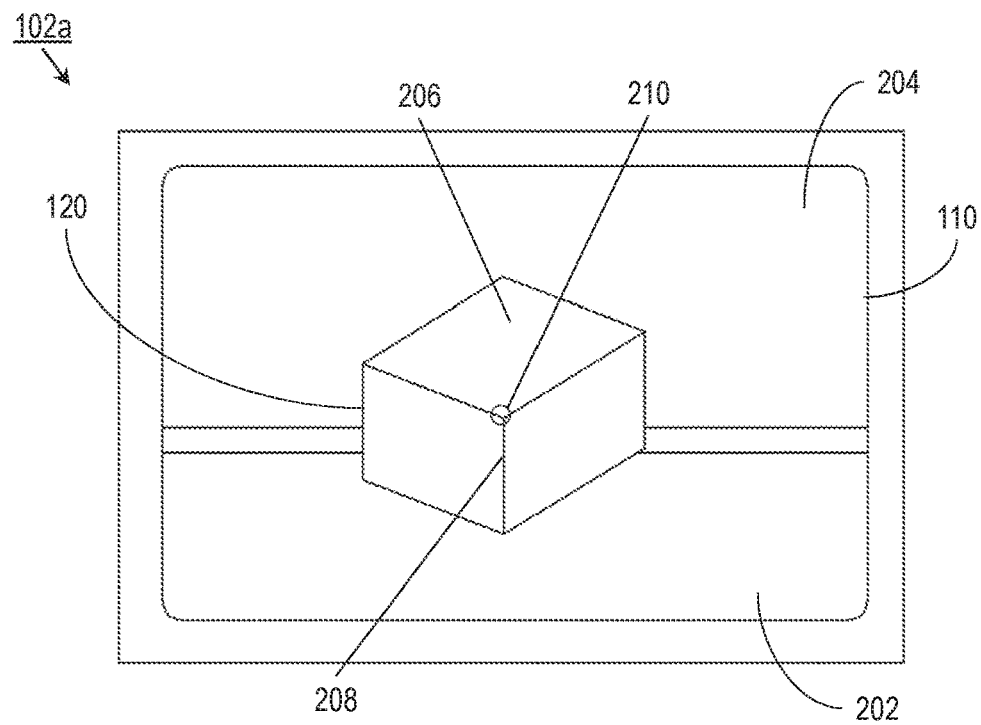
FIGS. 2A and 2B are diagrammatic illustrations of a mobile device of the volume dimensioning system of FIG. 1.

Referring to FIG. 2A, the mobile device 102a may be implemented and may function similarly to the mobile device 102 of FIG. 1, except that the mobile device 102 may be oriented toward the target object 120 in such a way that the 2D imager (104, FIG. 1) captures an image stream (126, FIG. 1) of a field of view including the target object (or multiple objects). In embodiments, the display surface 110 may display the image stream 126 to the operator of the mobile device 102 in real time or near real time. The operator of the mobile device 102 may position or orient the target object 120 (or the mobile device relative to the target object) to optimally position the target object within the field of view for image analysis. For example, the target object 120 may be positioned proximate to a floor surface (202) and/or wall (204) of optimal contrast to the target object (e.g., in color, in texture) or lit so as to optimize the contrast between the target object and the floor/wall.

In some embodiments, the operator may position and orient the mobile device 102 relative to the target object 120 so that the entire upper surface (206) of the target object is clearly visible to the 2D imager 104, and that a forward vertical edge (208) and forward top corner or vertex (210) faces the 2D imager. In embodiments, the volume dimensioning system (100, FIG. 1) may analyze the target object 120 based on cumulative views captured from multiple orientations around the target object 120.

In embodiments, the image and control processors (108, FIG. 1) may analyze the image stream 126 or component frames thereof to distinguish the target object 120 from its surroundings. For example, the image and control processors 108 may attempt to identify patterns and shifts in color and texture that may be indicative of the target object 120 or its parameters (e.g., surfaces, edges, vertices).

Figure 2B:
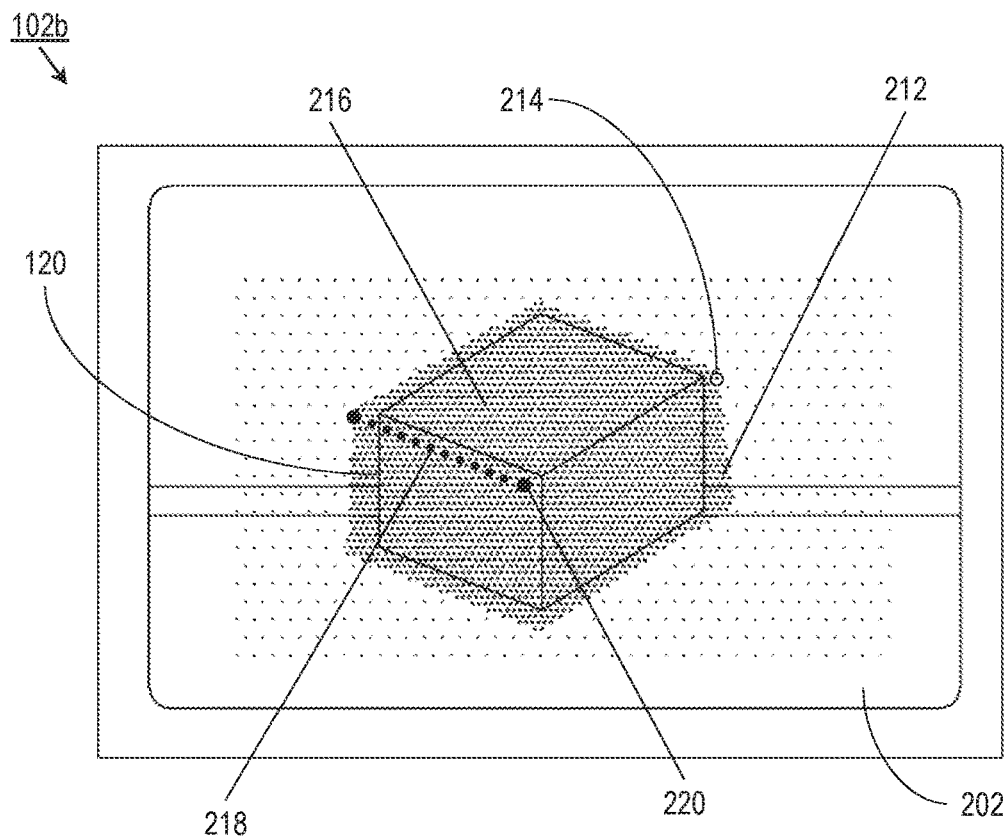

Referring now to FIG. 2B, the mobile device 102b may be implemented and may function similarly to the mobile device 102a of FIG. 2A, except that the mobile device 102b may display via the display surface 110, in addition to the image stream (126, FIG. 1) captured by the 2D imager (104, FIG. 1), 3D image data (128, FIG. 1) captured by the 3D imager (106, FIG. 1).

In embodiments, the field of view of the 3D imager 106 may substantially correspond to the field of view of the image stream 126 captured by the 2D imager 104. The 3D image data 128 may include a stream of pixel sets, each pixel set substantially corresponding to a frame of the 2D image stream 126. Accordingly, the pixel set may include a point cloud 212 (e.g., point map) substantially corresponding to the target object 120. Each point 214 of the point cloud 212 may include a coordinate set (e.g., XY) locating the point relative to the field of view (e.g., to the frame, to the pixel set) as well as plane angle and depth data of the point, e.g., the distance of the point from the mobile device 102

While the 2D imager 104 attempts to define the target object 120 within its field of view based on texture, color, or lighting analysis of the image stream 126, the 3D imager 106 may analyze depth information about the target object 120 and its environment as shown within its field of view. For example, the 3D imager 106 may identify the floor 202 as a plane of gradually increasing depth that meets an intersecting plane (e.g., a rear wall 204 or a candidate plane surface 216 corresponding to a surface (120a-c, FIG. 1) of the target object 120). Based on the intersections of the candidate plane surfaces 216 of the target object 120 (e.g., with each other or with the floor 202), the 3D imager 106 may identify candidate edges 218. Similarly, the intersection of three plane surfaces, or the intersection of two candidate edges 218, may indicate a candidate vertex 220.

In some embodiments, the volume dimensioning system 100 may account for imperfect data sets, e.g., gaps or holes in the point cloud, via plane identification. For example, the volume dimensioning system may analyze 3D spatial information 128 (independently or fused with the 2D image stream 126) to infer the planes of the target object 120, e.g., on the basis of a sufficient number of identified points aligned in a plane or nearly enough aligned (e.g., within a predetermined range) to derive the existence of a plane. By utilizing plane identification based solely on 3D spatial information 128 collected by the 3D imager 106, the volume dimensioning system 100 may identify the target object 120 and its component planes quickly enough, or to a sufficient level of confidence, that fusion of 2D image data 126 may not be necessary for optimal performance. In some embodiments, the volume dimensioning system may similarly infer the edges or vertices of the target object 120 based on the placement or alignment of individual points.

Figure 3A:
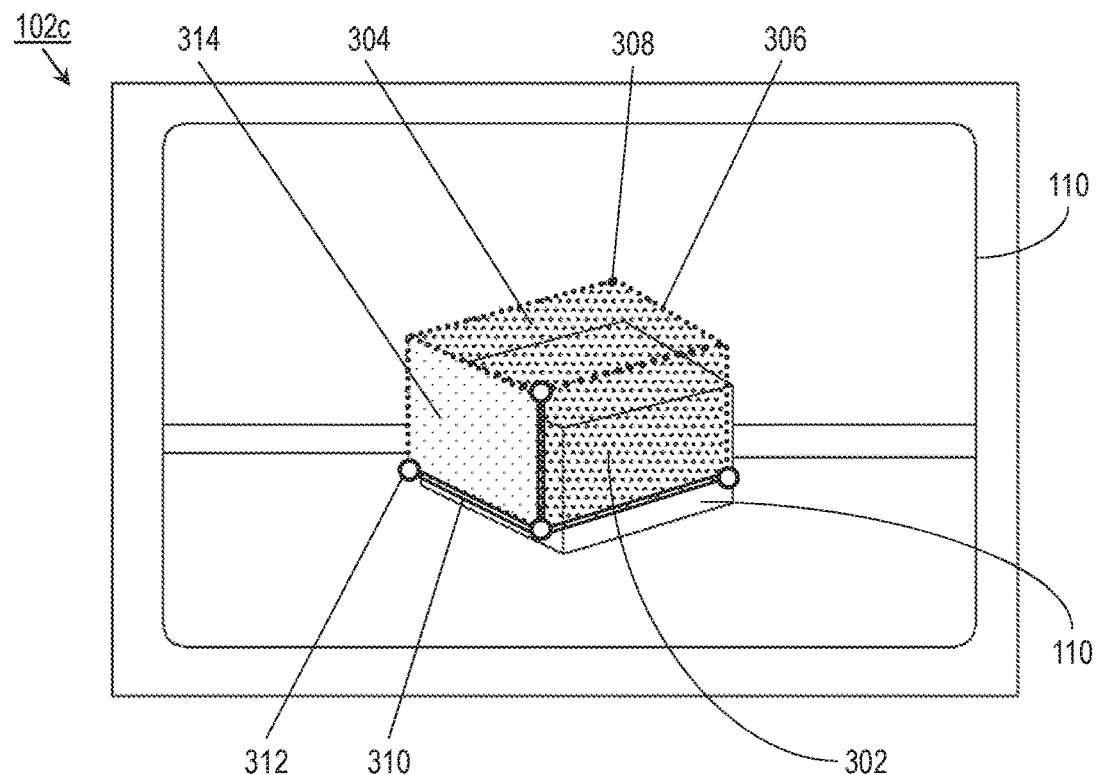
FIGS. 3A and 3B are diagrammatic illustrations of a mobile device of the volume dimensioning system of FIG. 1.

Referring to FIG. 3A, the mobile device 102c may be implemented and may function similarly to the mobile device 102b of FIG. 2B, except that with respect to the mobile device 102c, the volume dimensioning system (100, FIG. 1) may correlate the 2D image stream (126, FIG. 1) and 3D point cloud (212, FIG. 2B) to identify the target object 120 and generate a holographic model 302 corresponding to the target object.

By correlating color, form, and texture analysis of the image stream 126 with depth information from the 3D point cloud 212, the volume dimensioning system 100 may identify candidate parameters of the target object 120 and digitally represent these candidate parameters in the holographic model 302. For example, the volume dimensioning system 100 may tentatively identify candidate surfaces 304, candidate edges 306, and candidate vertices 308 of the holographic model 302, which candidate surfaces, edges, and vertices correspond to the real-world parameters (e.g., surfaces 120a-c, FIG. 1) of the target object 120. Based on the tentative dimensions of these candidate surfaces 304, candidate edges 306, and candidate vertices 308, the holographic model 302 may be displayed to the operator of the mobile device 102c (e.g., via the display surface 110) as a three-dimensional object. In embodiments, the manner or style in which the holographic model 302 is displayed may vary based on operator preference or control input, e.g., wireframe, semitransparent solid, monochrome, multicolor.

In embodiments, the volume dimensioning system 100 will generate the holographic model 302 by overlaying the the target object 120 with edge lines 310 (e.g., edge guides), vertex points 312 (e.g., vertex guides), and/or surface guides 314 (e.g., solid, shaded, textured planes, or planes of varying opaqueness) as the volume dimensioning system locks onto the target object 120, indicating to the user/operator that the target object has been positively identified. Further, the 2D image of the target object 120 may be transposed onto or otherwise incorporated into the holographic model 302, such that the 3D holographic model 302 appears substantially similar to the user/operator as would the real target object 120 (e.g., when viewed directly or via the 2D imager 104).

In embodiments, the volume dimensioning system 100 may be trained via machine learning to recognize and lock onto a target object 120, positively identifying the target object and distinguishing the target object from its surrounding environment (e.g., the field of view of the 2D imager 104 and 3D imager 106 including the target object as well as other candidate objects, which may additionally be locked onto as target objects and dimensioned). For example, the volume dimensioning system 100 may include a recognition engine trained on positive and negative images of a particular object specific to a desired use case. As the recognition engine has access to location and timing data corresponding to each image or image stream (e.g., determined by a clock 114/GPS receiver 116 or similar position sensors of the embodying mobile device 102a or collected from image metadata), the recognition engine may be trained to specific latitudes, longitudes, and locations, such that the performance of the recognition engine may be driven in part by the current location of the mobile device 102a, the current time of day, the current time of year, or some combination thereof.

Figure 3B:
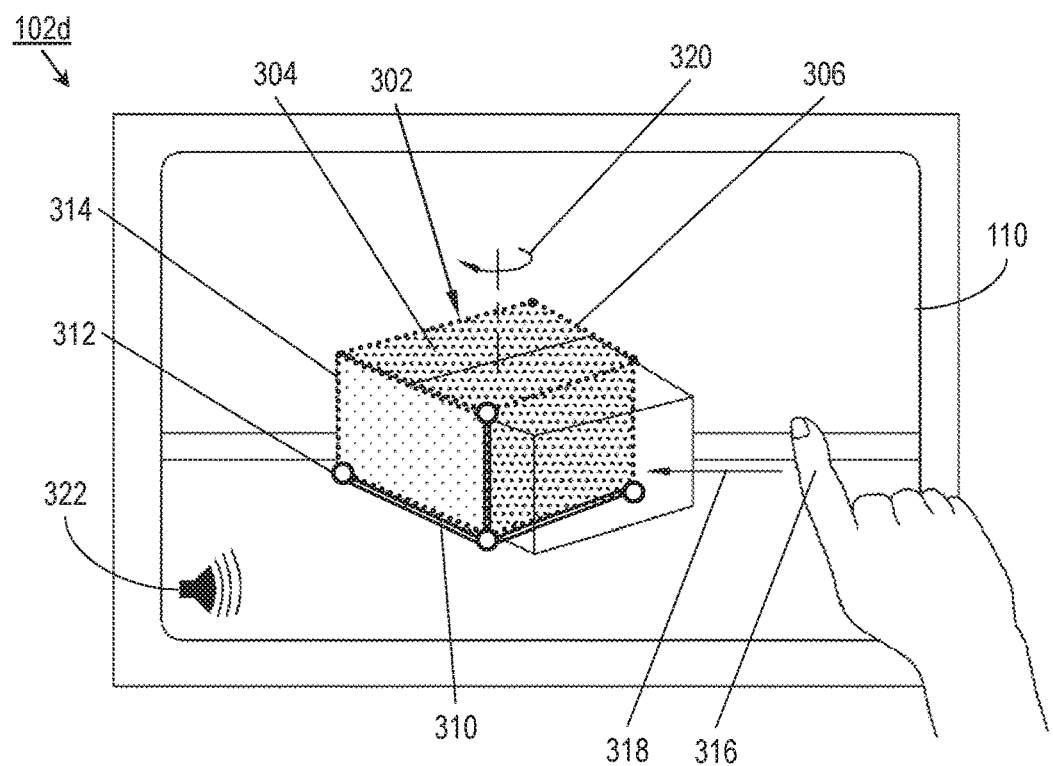

Referring to FIG. 3B, the mobile device 102d may be implemented and may function similarly to the mobile device 102c of FIG. 3A, except that with respect to the mobile device 102d, once the holographic model 302 is generated by the volume dimensioning system (100, FIG. 1), the operator may manipulate the holographic model 302 as displayed by the display surface 110. For example, by sliding his/her finger (316) across the touch-sensitive display surface 110, the operator may move (318) the holographic model 302 relative to the display surface (e.g., and relative to the image stream 126 and target object (or multiple objects simultaneously in the field of view) 102 portrayed thereby) or rotate (320) the holographic model. Similarly, the candidate parameters of the holographic model 302, e.g., edge guides 310, vertex guides 312, and surface guides 314 (or their corresponding candidate surfaces 304, candidate edges 306, and candidate vertices 308) may be shifted, resized, or corrected as shown below. In embodiments, the holographic model 302 may be manipulated based on aural control input 322 submitted by the operator (e.g., via a microphone (140, FIG. 1) disposed within the mobile device 102d). For example, the volume dimensioning system 100 may respond to verbal commands from the operator, e.g., to shift or rotate the holographic model 302, or to select and shift an edge guide 310, vertex guide 312, or surface guide 314.

Figure 4A:
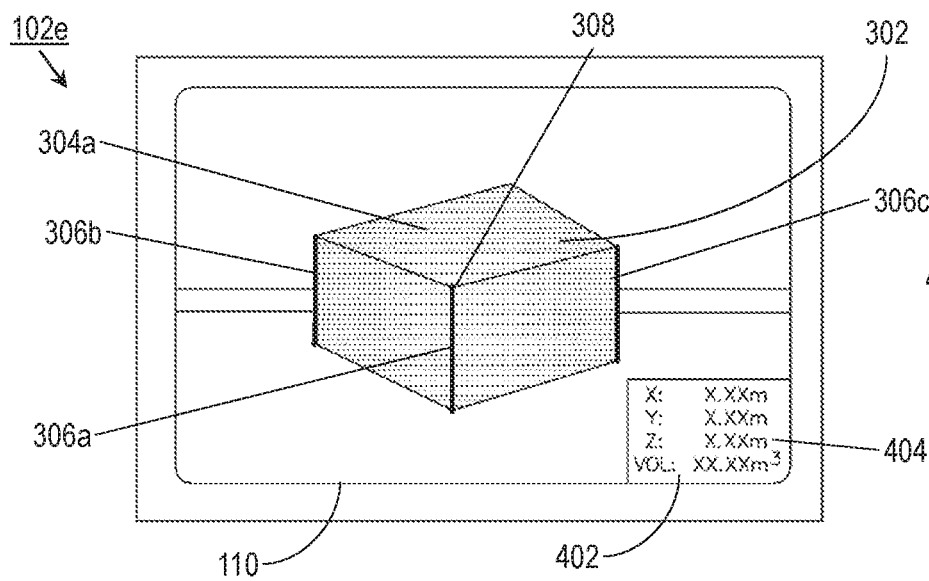
FIGS. 4A through 4C are diagrammatic illustrations of a mobile device of the volume dimensioning system of FIG. 1.
Figure 4B:
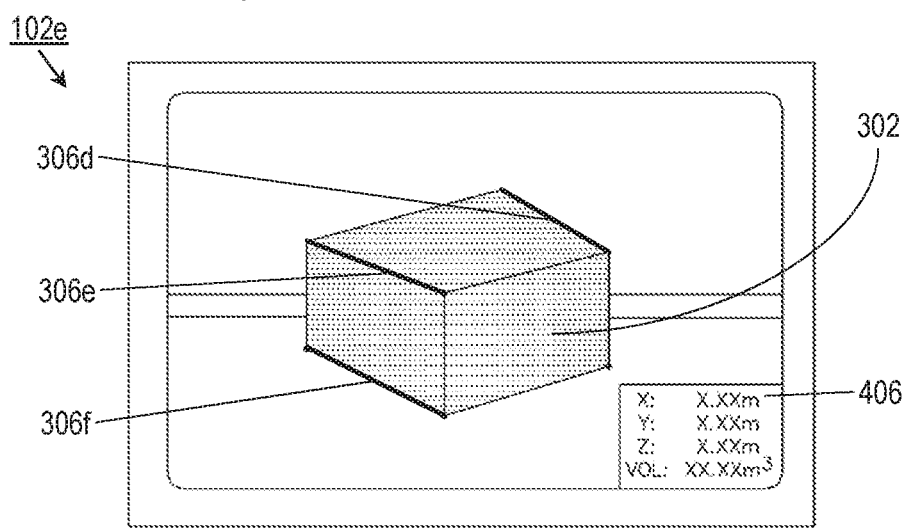
Figure 4C:
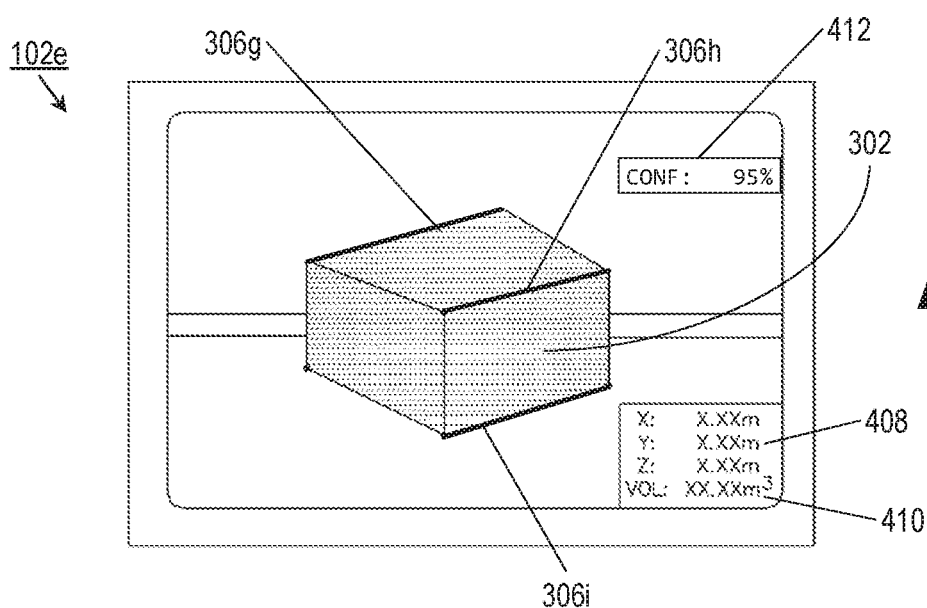

Referring to FIGS. 4A through 4C, the mobile device 102e may be implemented and may function similarly to the mobile device 102d of FIG. 3B, except that with respect to the mobile device 102e, when the target object (120, FIG. 3B) has been identified (e.g., the 3D point cloud (212, FIG. 2B) has been fused and correlated with the 2D image stream (126, FIG. 1) of the target object (120) and the candidate edges (306, FIG. 3B) and other candidate parameters of the holographic model 302 have been identified, the volume dimensioning system (100, FIG. 1) may measure the holographic model 302 to determine the dimensions of the target object 120 to which the holographic model 302 corresponds.

In embodiments, the holographic model 302 of the cuboid target object 120 may itself correspond to a cuboid digital representation. For example, in a preferred view of the holographic model 302 (as shown by FIGS. 4A-C) a top surface 304a, a forward edge 306a, and a top forward corner or vertex 308 (where the top surface and forward edge intersect) may all be displayed via the display surface 110. Further, nine of the twelve edges of the holographic model 302 may be displayed, or three edges for each linear dimension of the holographic model.

In embodiments, the volume dimensioning system 100 may determine the precise dimensions (402) of the target object 120 (e.g., x-axis width, y-axis breadth, z-axis height, volume) by measuring edges of the holographic model 302 corresponding thereto. For example, with respect to the z-axis height (404) of the target object 120, the volume dimensioning system 100 may measure the vertical edges 306a-c of the holographic model 302. By measuring two or three parallel vertical edges 306a-c rather than a single edge, the volume dimensioning system 100 may account for general model or technology variations, errors, or holes (e.g., incompletions, gaps) in the 3D point cloud 212 which may skew individual edge measurements (particularly if the hole coincides with a vertex 308 (e.g., an endpoint of the edge) of the holographic model 302. The volume dimensioning system 100 would apply the same methodology in measuring the other parallel edges (306d-f, 306g-i; FIGS. 4B and 4C) to produce a line length of all three dimensions 406, 408, 410 of the target object.

In embodiments, the volume dimensioning system 100 may adjust the measuring process (e.g., based on control input from the operator) for increased accuracy or speed. For example, the measurement of a given dimension may be based on multiple readings or pollings of the holographic model 302 (e.g., by generating multiple holographic models per second on a frame-by-frame basis and selecting "good" measurements to generate a result set (e.g., 10 measurement sets) for averaging). Alternatively or additionally, the three measurements of the vertical edges 306a-c may be averaged to determine a given dimension. Similarly, if two edges 306a-b within a single frame measure within a predetermined threshold (e.g., 5 mm), the measurement may be counted as a "good" reading for purposes of inclusion within a result set. In some embodiments, the confirmation tolerance may be increased by requiring all three edges 306a-c to be within the threshold variance for inclusion in the result set.

Referring in particular to FIGS. 4B and 4C, in embodiments the x-axis width 406, y-axis breadth 408, and volume 410 of the holographic model 302 (and therefore the target object 120) may similarly be determined by analysis and measurement of the x-axis edges 306d-f and y-axis edges 306g-i of the holographic model 302. In some embodiments, the volume dimensioning system 100 may proceed at a reduced confidence level if measurements cannot be established at full confidence. For example, the exterior surface of the target object 120 may be matte-finished, light-absorbing, or otherwise treated in such a way that the volume dimensioning system (particularly with respect to the 2D imager 104) may have difficulty accurately determining or measuring surfaces, edges, and vertices of the holographic model 302. Under reduced-confidence conditions, the volume dimensioning system 100 may, for example, reduce the number of minimum confirmations required for an acceptable measure (e.g., from 3 to 2) or analyze additional frames per second (e.g., sacrificing operational speed for enhanced accuracy). The confidence condition level (412) may be displayed to the user and stored in the dataset corresponding to the target object 120.

Figure 5A:
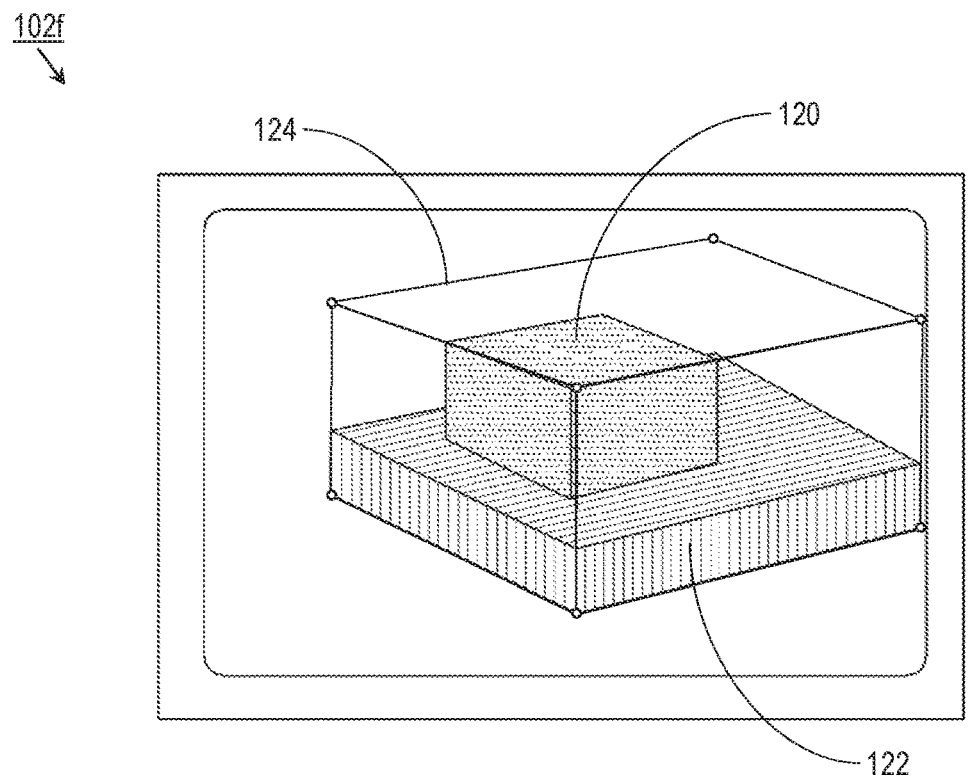
FIGS. 5A and 5B are diagrammatic illustrations of a mobile device of the volume dimensioning system of FIG. 1.
Figure 5B:
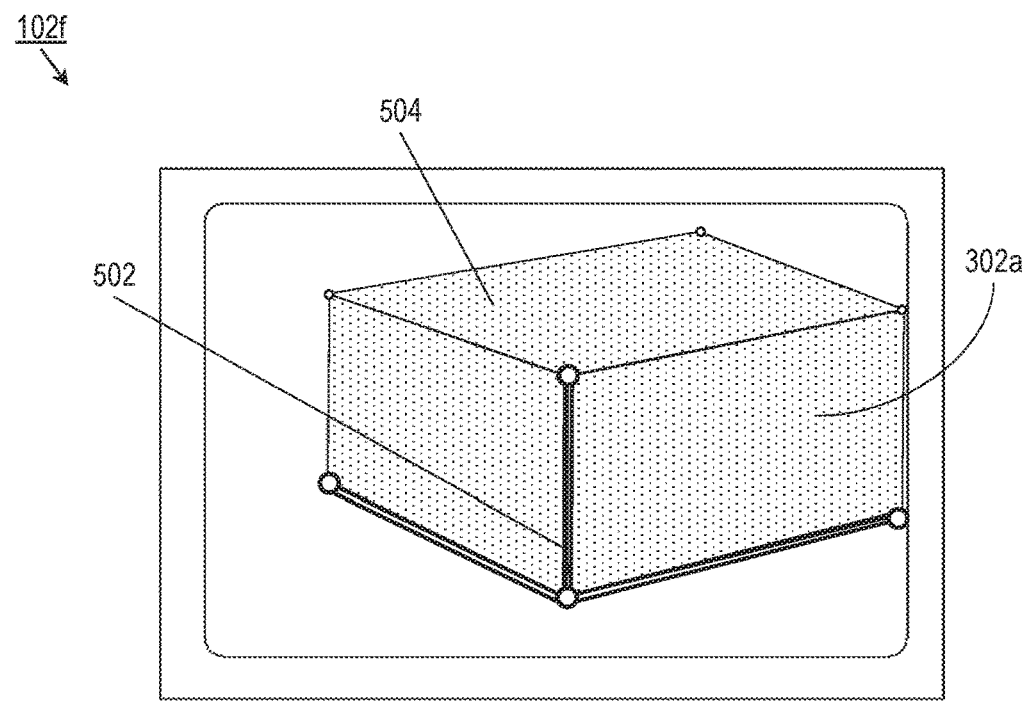

Referring to FIGS. 5A and 5B, the mobile device 102f may be implemented and may function similarly to the mobile device 102e of FIGS. 4A through 4C, except that with respect to the mobile device 102f, the volume dimensioning system (100, FIG. 1) may account for any pallets 122 or other foundations to which the target object 120 is attached, determining the minimum possible dimensions 124 of the target object (e.g., based on the minimum possible amount of shelf space the target object attached to the pallet would occupy in a vehicle, in a warehouse, or elsewhere in the supply chain. Referring in particular to FIG. 5B, the holographic model 302a may be implemented and may function similarly to the holographic model 302 of FIGS. 4A-B, except that the holographic model 302a may account for the pallet 122 in determining the minimum possible edges (502), minimum possible surfaces (504), and minimum possible volume of the target object 120 attached to the pallet 122.

Figure 6A:
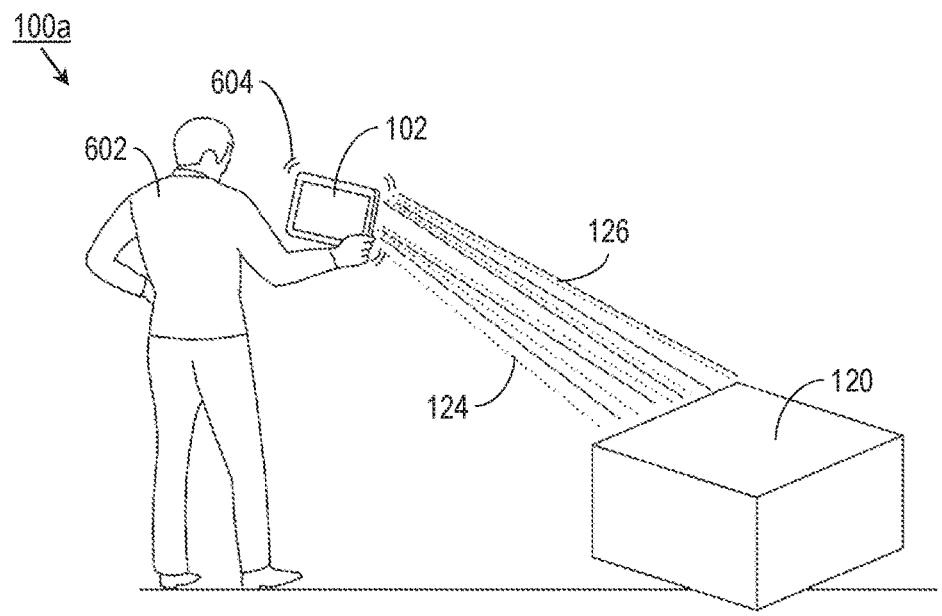
FIGS. 6A and 6B illustrate operations of, and a mobile device of, the volume dimensioning system of FIG. 1.

Referring to FIG. 6A, the volume dimensioning system 100a may be implemented and may function similarly to the volume dimensioning system 100 of FIG. 1, except that the volume dimensioning system 100a may monitor the onboard IMU (118, FIG. 1) of the mobile device 102 (e.g., or inertial/orientation sensors integrated into the 2D imager (104, FIG. 1) or 3D imager (106, FIG. 1) to detect difficulty in the identification of candidate surfaces (304, FIGS. 3A-B), candidate edges (306, FIGS. 3A-B), and candidate vertices (306, FIGS. 3A-B) from the holographic model 302 (FIGS. 3A-B) corresponding to the target object 120.

For example, the IMU 118 may detect excessive shifts in the orientation of the mobile device 102 as the user (602) moves the mobile device around (604) and the volume dimensioning system 100a attempts to lock into the parameters of the target object via the 2D image stream 126 and the 3D image data 128. Similarly, the IMU 118 may notice rotational movement by the user 604 around the target object 120 and take this movement into account in the generation of the 3D holographic model 302.

Figure 6B:
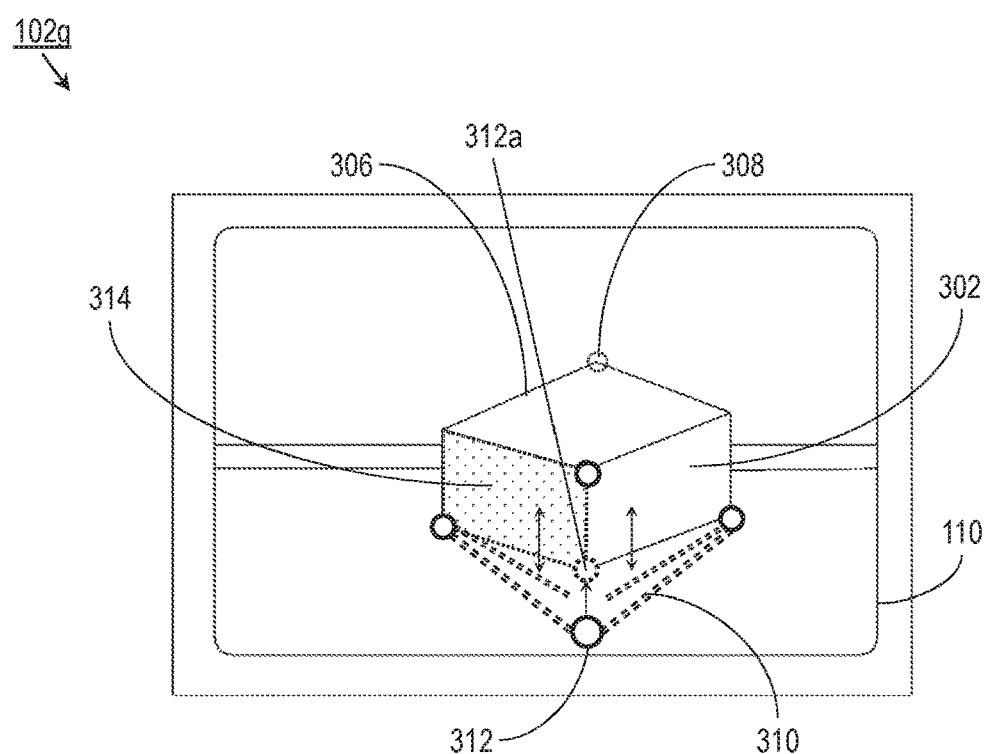

Referring in particular to FIG. 6B, the mobile device 102g may be implemented and may function similarly to the mobile device 102 of FIG. 6A, except that with respect to the mobile device 102g, the volume dimensioning system 100a may respond to the detection of certain types of motion by the IMU 118 by displaying surface guides 314 (e.g., planar guides), edge guides 310, and vertex guides 312 to assist the user 602 in manually adjusting the candidate planes 310, edges 306 and candidate vertices 308 of the holographic model 302. For example, the user 602 may manipulate the edge guides 310, surface guides 314, and/or vertex guides 312 (e.g., via the touch-sensitive display surface 110) to precisely set the candidate edges 306 and candidate vertices 308 so that the volume dimensioning system 100a may accurately measure the holographic model 302. In some embodiments, the volume dimensioning system 100a may sense a user/operator manipulating a surface guide 314, edge guide 310, or vertex guide 312 and understand intuitively where the user is intending to place the vertex guide (312a), in which case the vertex guide 312 would automatically snap into the nearest logical place.

Figure 7:
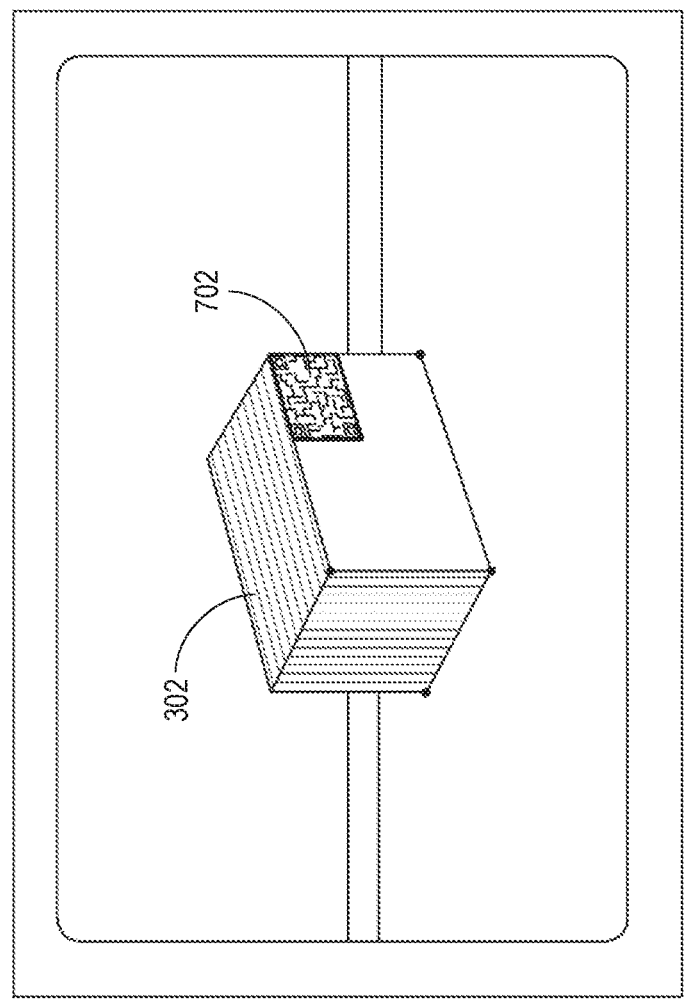
FIG. 7 is a diagrammatic illustration of a mobile device of the volume dimensioning system of FIG. 1.

Referring now to FIG. 7, the mobile device 102h may be implemented and may function similarly to the mobile device 102g of FIG. 6B and the mobile devices 102, 102a-f of FIGS. 1 through 5B, except that with respect to the mobile device 102h, the volume dimensioning system (100, FIG. 1; 100a, FIG. 6A) may analyze the 2D image stream (126, FIG. 1) to detect and decode any encoded information on an exterior surface of the target object (120, FIG. 1), e.g., QR codes, barcodes, text, and any other scannable codes. Similarly, the volume dimensioning system 100, 100a may analyze the 3D image data (128, FIG. 1) and the holographic model 302 to detect and decode 3D encoded identifiers (702) on an exterior surface of the holographic model. For example, 3D encoded identifiers 702 may include any three-dimensional feature on or of an exterior surface of the target object 120 detectable as a digital mark and decodable by the volume dimensioning system 100, 100a. 3D encoded identifiers 702 may include encoded three-dimensional features imperceptible or barely perceptible to the naked eye, or to the 2D imager (104, FIG. 1), e.g., watermarks, grooves, ridges, raised or indented patterns, geometric patterns, textures, or any combination thereof. In embodiments, 3D encoded identifiers 702 may be incorporated into blockchain-driven or other types of distributed ledgers configured for tracking the target object 120 through a supply chain. For example, the 3D encoded identifier 702 may incorporate a unique identifier of the target object 120, uniquely identifying its contents, origin, destination, handling instructions, perishability, and any other aspects and details specific to the target object, allowing the target object to be individually and fully traceable at any point within the supply chain. Accordingly, the full history of the target object 120 may be transparent to parties at any point of the supply chain or beyond it, e.g., manufacturers and wholesalers, third party transporters and logistics managers, retailers and trade associations, consumers and watchdog organizations, or public authorities.

Figure 8A:
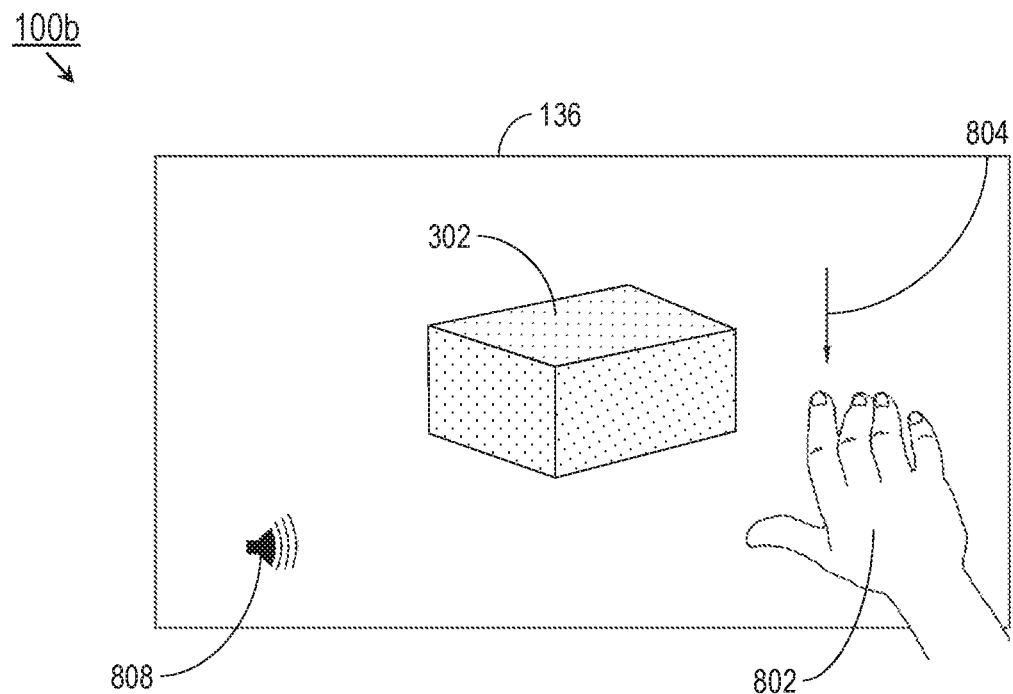
FIGS. 8A and 8B are diagrammatic illustrations of an augmented reality (AR) device of the volume dimensioning system of FIG. 1.
Figure 8B:
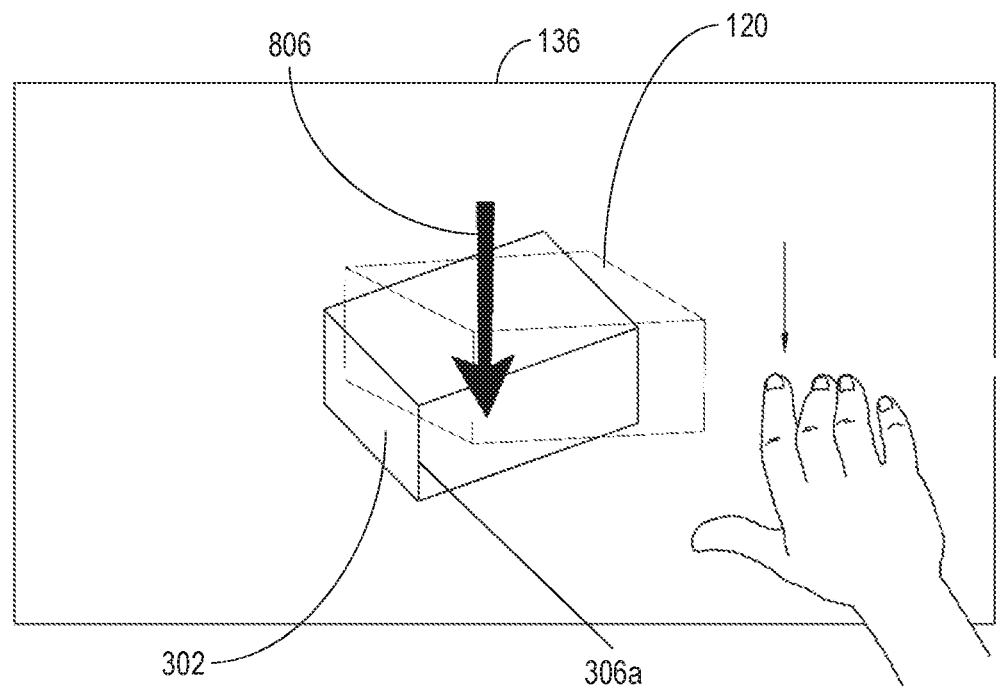

Referring to FIGS. 8A and 8B, the volume dimensioning system 100b may be implemented and may function similarly to the volume dimensioning systems 100, 100a of FIGS. 1 and 6a, except that the volume dimensioning system 100b may display the 2D video stream (126, FIG. 2), the 3D image data (128, FIG. 1) and the holographic model 302 via the AR viewing device 136. For example, the volume dimensioning system 100b may be compatible with Microsoft HoloLens 1/2, MagicLeap, Oculus Rift, and other similar AR, VR, and MR wearable retinal display devices, broadcasting in real time or near real time to the AR viewing device 136 (via the wireless link 112a, FIG. 1) as an alternative to, or in addition to, the mobile device 102 (FIG. 1). In embodiments, the AR viewing device 136 may be immediately proximate to, and physically linked to, the mobile device 102, receiving the 2D image stream 126 and 3D image data 128 via the physical link.

In embodiments, the AR viewing device 136 may detect and respond to control input provided by the wearer, adjusting the AR/MR display accordingly (either individually or in conjunction with the mobile device 102 capturing the 2D video stream 126 and 3D image data 128. For example, the wearer may move his/her hand 802 slowly downward (804) within the field of view of the AR viewing device 136, which the volume dimensioning system 100b may interpret as a command to rotate downward (806) the holographic model 302 (e.g., relative to its forward edge 306a) while the 2D image stream 126 featuring the target object 120 remains fixed in its real-world orientation. The wearer may similarly submit control input to move or resize the holographic model 302 relative to the target object 120 or access any encoded information detected and decoded via the 2D image stream 126 (e.g., QR codes, barcodes, and other 2D encoding) or the holographic model 302 (e.g., 3D encoded identifiers (702, FIG. 7)).

In embodiments, the volume dimensioning system 100b may recognize and respond to verbal control input (808) provided by the wearer and detected by the AR viewing device 136. In some embodiments, the wearer of the AR viewing device 136 may view and manipulate the holographic model 302 via the wireless link 112a from a physical location remotely located from the target object 120 and the mobile device 102.

Figure 9A:
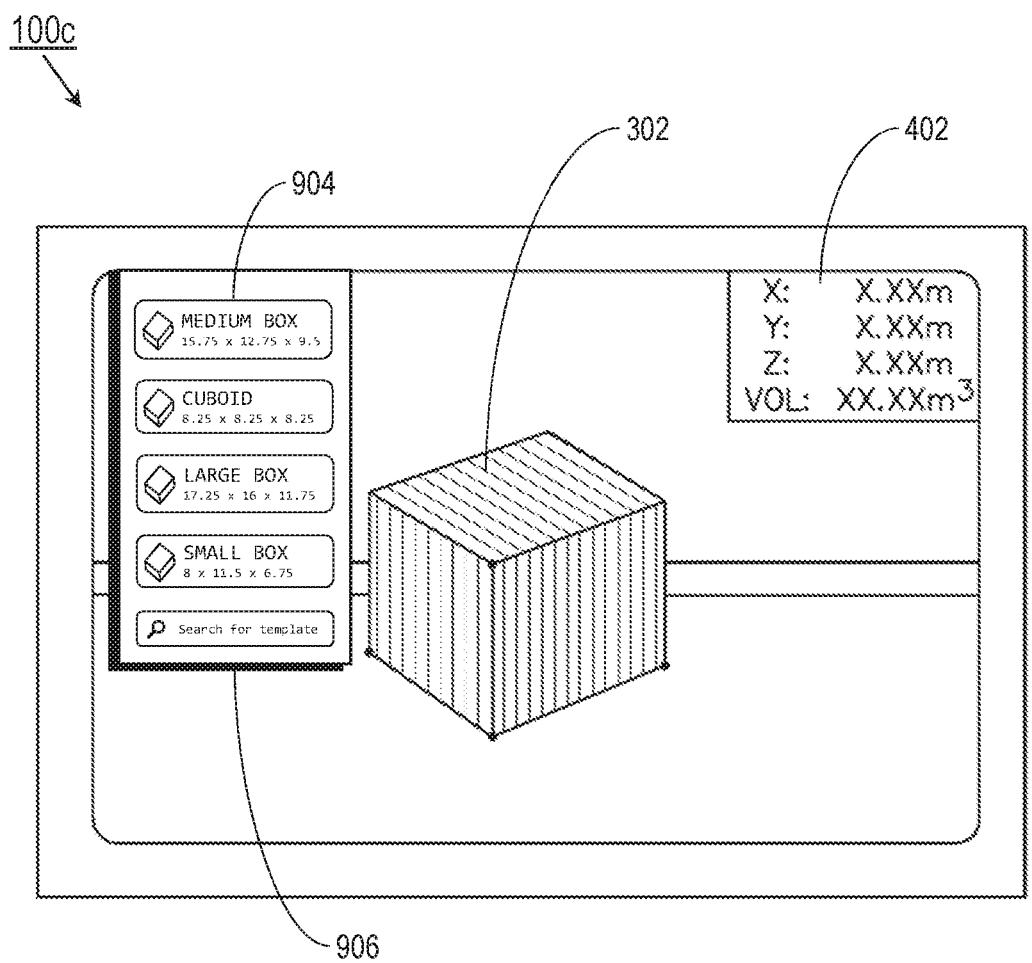
FIGS. 9A and 9B illustrate operations of, and the mobile device of, the volume dimensioning system of FIG. 1.

Referring to FIG. 9A, the volume dimensioning system 100c may be implemented and may function similarly to the volume dimensioning systems 100, 100a-b of FIGS. 1, 6A, and 8A, except that the volume dimensioning system 100c may compare the holographic model 302 to additional reference data (e.g., stored to the memory 134, FIG. 1) in order to make additional determinations with respect to the target object (120, FIG. 1) to which the holographic model corresponds after the dimensions 402 of the target object have been determined to a sufficient level of accuracy or confidence.

For example, the volume dimensioning system 100c may compare the dimensions 402 of the target object 120 to the dimensions of shipping boxes (902) or predetermined templates (904) corresponding to shipping boxes or other known objects having known dimensions (e.g., stored to memory 138 or accessible via cloud-based storage 132 or remote databases stored on physical servers 130). The volume dimensioning system 100c may display for the user's selection (e.g., via a searchable menu 906) templates 904 corresponding to storage containers, storage bins, or storage locations and sublocations within racking, shelving or organizing systems of various sizes. The user may compare the determined dimensions 402 of the target object to a predetermined template 904 to determine, e.g., whether the target object 120 corresponds to a template 904, whether the target object will fit inside a larger object or within a given shipping space, or for auditing or certifying a dimension measurement, or for calibrating/verifying the accuracy of the volume dimensioning system 100c. Alternatively, the user may manually enter template dimensions to which the measured dimensions 402 of the target object 120 may be compared (e.g., if the orientations of a template 904 do not precisely match a target object 120 to which the template dimensions may otherwise correspond). If the object data (e.g., as decoded from 2D encoding or 3D encoded identifiers (702, FIG. 7)) corresponding to the target object 120 does not provide sufficient information about the target object (e.g., guidelines for storage, transport, or perishability), the volume dimensioning system 100c may infer this information from what is known about similarly sized shipping boxes 902 or their contents. Similarly, the user may fill in the dimensions 402 of the target object 120 based on a corresponding template 904 that approximates or matches the dimensions of the target object. The user may create a new template by measuring a target object 120 and adding its dimensions 402 as a new known object.

Figure 9A:
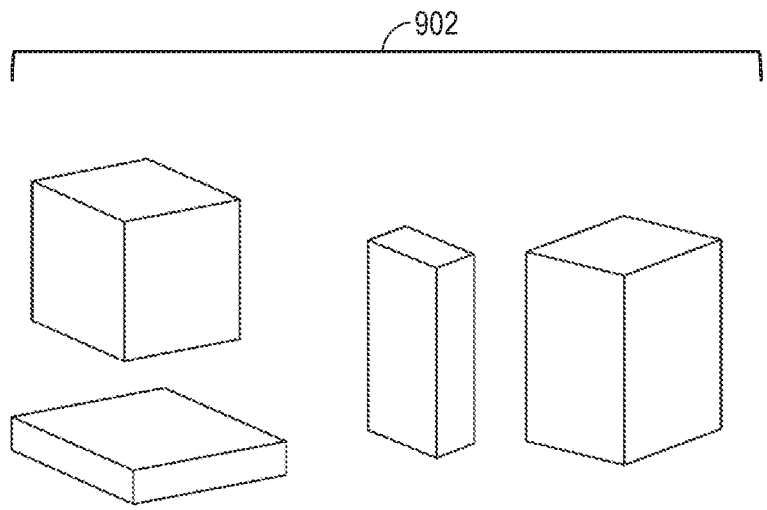
Figure 9B:
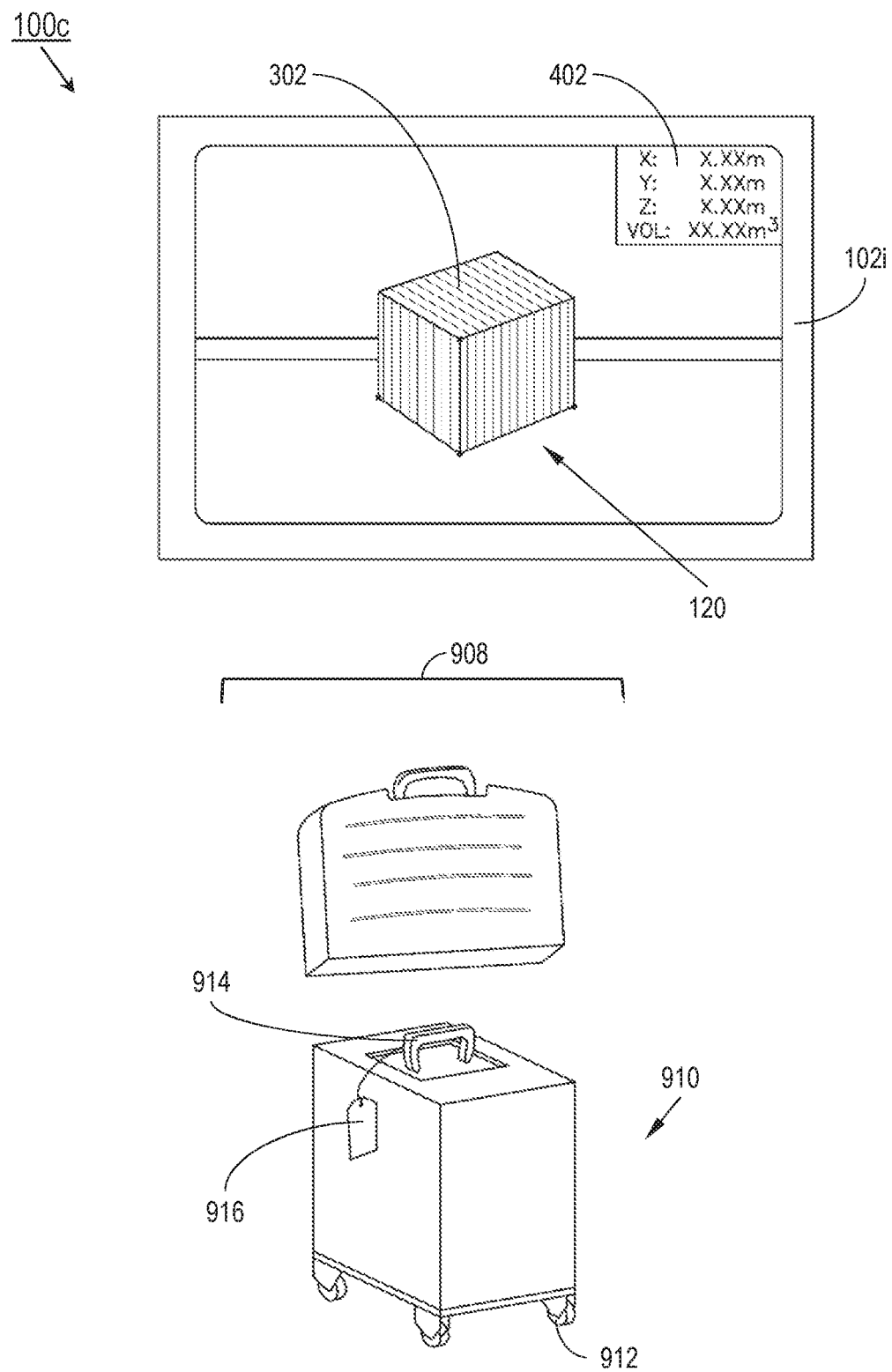

Referring to FIG. 9B, the mobile device 102 of the volume dimensioning system 100c may be implemented by an operator at an aircraft gate to analyze carry-on items, generate holographic models 302 corresponding thereto, and compare the dimensions 402 of the corresponding carry-on items to standard-sized luggage items (908). In this way, the volume dimensioning system 100*c* may make rapid-response determinations, e.g., whether a particular carry-on item or piece of luggage should be checked instead, or whether the said item or piece is likely to fit under a seat or within an overhead bin (e.g., corresponding to a particular aircraft type, cabin layout, seat class, seat type, or assigned seat). For example, the user may create a template called "SMALL BOX" (904*a*) having predefined dimensions of 8"×11.5"×6.75", measuring a target object corresponding to these dimensions via the volume dimensioning system 100*c* to calibrate the volume dimensioning system and "learn" the new template for future reference.

In some embodiments, the volume dimensioning system 100*c* may identify one or more target objects 120 (e.g., within the FOV of the 2D imager 104 and 3D imager 106) by recognizing the object as a known object based on a comparison of 2D image data 126 and/or 3D spatial information 128 to records of other, similar objects (e.g., stored to memory 138, cloud-based storage 130, or remote physical servers 132). For example, the volume dimensioning system 100*c* may identify the target object 120 within the FOV of the mobile device 102*i* by comparing the target object to reference examples of known 2D imagery or 3D image models (e.g., computer-aided design (CAD) models) to identify similarities in size, dimensions, shape features, or other aspects of the reference images to build confidence in the similarly of the target object to another known object. If sufficient confidence is achieved, the volume dimensioning system 100*c* may positively identify the target object as equivalent to a known reference object; otherwise, additional scanning operations may be performed to reinforce confidence levels or confirm an identification. Reference comparison data may be used by the volume dimensioning system 100*c* to supplement the holographic model 302 or aid in dimensioning, measurement and analysis operations.

For example, the volume dimensioning system 100*c* may compare the target object 120 to a particular suitcase 910, noting any similarities in proportions and the presence or absence of, e.g., casters 912, a handle 914, or identification tagging 916. If the observed similarities are strong enough, the volume dimensioning system 100*c* may conclude with sufficient confidence that the target object 120 is equivalent to the suitcase 910, or that the target object 120 is indeed a suitcase of that particular model or size.

In some embodiments, the volume dimensioning system 100*c* may identify the target object 120 as, for example, a specific class of object, a subobject, or a component or part of a larger or more complex device based on comparison of the target object to reference data. For example, the caster 912 may be removed from the suitcase 910 and scanned by the volume dimensioning system 100*c*, which may compare the caster to similar parts or components (e.g., within parts catalogs accessible via memory 138, cloud-based storage 130, or remote physical servers 132) and determine specific object data corresponding to the caster, e.g., a manufacturer, make, or model number. Similarly, pieces or parts may be removed from complex devices or systems, e.g., a pump removed from an engine, and scanned to identify the specific object (and acquire corresponding object data thereof) via comparison with reference manufacturer databases.

Figure 10A:
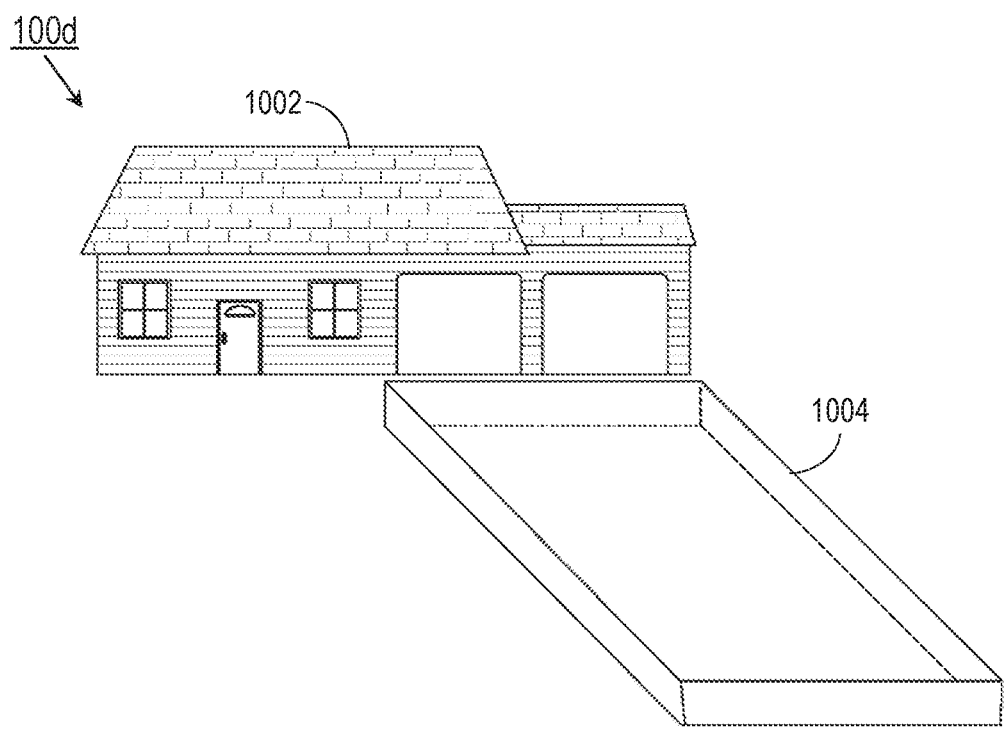
FIGS. 10A and 10B illustrate operations of, and the mobile device of, the volume dimensioning system of FIG. 1.
Figure 10B:
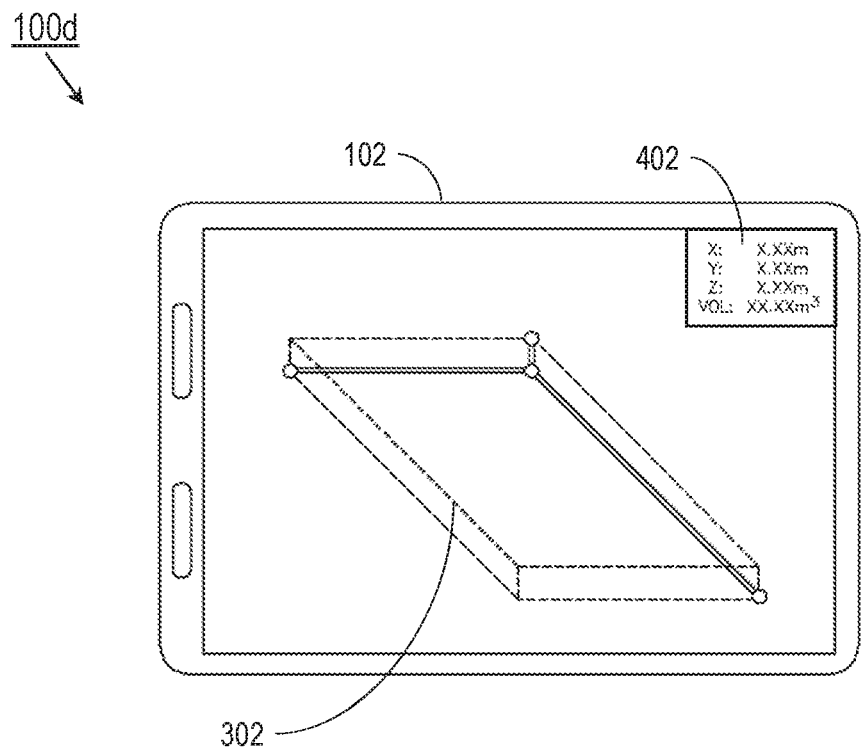

Referring to FIGS. 10A and 10B, the volume dimensioning system 100*d* may be implemented and may function similarly to the volume dimensioning system 100*c* of FIG. 9, except that the target object of the volume dimensioning system 100*d* may include non-cuboid objects or non-solid objects. For example, the operator of the mobile device 102 may wish to determine a volume of concrete necessary to fill the driveway 1002 of the residence 1004 to a desired depth. The operator may position the mobile device 102 to capture a 2D image stream (126, FIG. 1) and 3D image data (128, FIG. 1) corresponding to the driveway 1002, generating an appropriate holographic model 302 of the driveway and determining the dimensions 402 of the holographic model 302. Similarly, the volume dimensioning system 100*d* may be implemented to accurately measure the dimensions and volume of gaps, holes, or portions otherwise missing from an object, e.g., potholes in a street or road; open wounds; cracks or fissures in a wall or structure; and empty pools or reservoirs.

Figure 11:
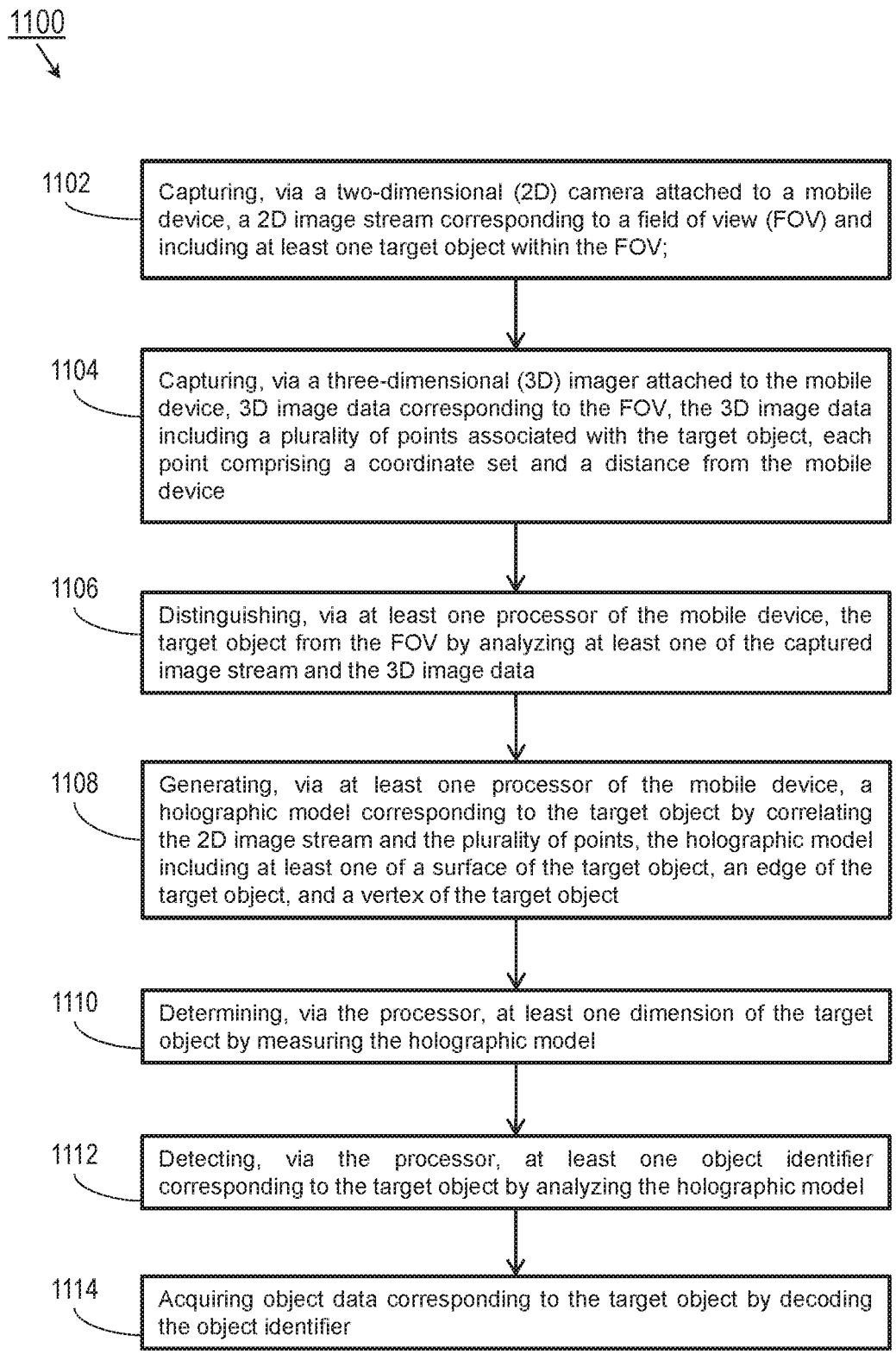
FIG. 11 is a flow diagram illustrating a method for volume dimensioning via sensor fusion, in accordance with example embodiments of this disclosure.

Referring to FIG. 11, a method 1100 for volume dimensioning of a substantially cuboid target object (e.g., having a height, a width, and a breadth) via sensor fusion may be implemented by embodiments of the volume dimensioning systems 100, 100*a-d*.

At a step 1102, a two-dimensional (2D) camera or imaging system attached to a mobile device captures a 2D image stream corresponding to a field of view (FOV) and including at least one target object within the FOV. In some embodiments, the 2D image stream may include multiple target objects.

At a step 1104, a three-dimensional (3D) imager of the mobile device collects 3D image data corresponding to the FOV; the 3D image data may include a cloud or set of points corresponding to each target object, where each point comprises a coordinate set relative to the FOV and distance information, e.g., a distance of the point from the mobile device At a step 1106, a processor of the mobile device distinguishes the target object from the FOV (e.g., locks onto the target object from within the surrounding environment) by analyzing at least one of the 2D image stream and the 3D image data. For example, the volume dimensioning system may analyze the 3D point cloud to identify planar surfaces, edges, or vertices of the target object, e.g., based on the alignment or relative distance of points or groups of points within the point cloud.

At a step 1108, the processor generates (and the display surface displays) a holographic model corresponding to each positively identified target object by correlating the 2D image stream and the corresponding point cloud. The holographic model includes surfaces and adjustable surface guides corresponding to the planar surfaces of the target object, edges and adjustable edge guides corresponding to the edges of the target object, and vertices and adjustable vertex guides corresponding to the vertices of the target object At a step 1110, the processor determines one or more dimensions of the target object by measuring the holographic model. For example, the processor may measure sets of parallel edges to determine a given dimension to a particular confidence level.

At a step 1112, the processor detects object identifiers of the target object by analyzing the holographic model. For example, the processor may detect 2D encoded information (e.g., barcodes, QR codes) or 3D encoded information integrated into a surface of the target object.

At a step 1114, the processor decodes the identified 2D and 3D object identifiers to obtain object data corresponding to the target object, e.g., supply chain or shipping data uniquely identifying the target object within the supply chain or chain of custody. The processor may supplement the object data with additional data, e.g., uploading the 2D image stream and 3D holographic model to a cloud archive, submitting the measured dimensions for auditing or further analysis, adding geolocation and timestamp data to assure point-in time condition and location continuity of the target object.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. An apparatus for volume dimensioning via sensor fusion, comprising:
    a housing capable of being carried by an operator;
    at least one two-dimensional (2D) image sensor disposed within the housing, the 2D image sensor configured to capture at least one image stream corresponding to a field of view (FOV), the FOV including at least one target object;
    at least one three-dimensional (3D) imager disposed within the housing, the 3D imager configured to generate 3D image data associated with the FOV, the 3D image data including at least one plurality of points associated with the target object, each point corresponding to a coordinate set and a distance from the apparatus;
    at least one processor disposed within the housing and operatively coupled to the 2D image sensor and the 3D imager, the processor configured to:
        a) distinguish the target object within the FOV by analyzing at least one of the captured image stream and the 3D image data;
        b) generate at least one holographic model corresponding to the target object by correlating the 3D image data and the captured image stream, the holographic model including at least one of a surface of the target object, a vertex of the target object, and an edge of the target object;
        c) determine at least one dimension of the target object by measuring the holographic model;
        d) detect at least one object identifier corresponding to the target object by analyzing the holographic model; and
        e) acquire object data corresponding to the target object by decoding the object identifier;
    a touch-sensitive display surface disposed within the housing and coupled to the processor, the display surface configured to:
        a) display the captured image stream;
        b) superimpose the holographic model over the captured image stream;
        c) receive control input from the operator; and
        d) adjust the holographic model based on the received control input;
    and
    at least one wireless transceiver disposed within the housing and configured to establish a wireless link to at least one remote source.

2. The apparatus of claim 1, further comprising:
    at least one inertial sensor disposed within the housing and configured to determine at least one of a) an orientation of the apparatus and b) a rate of change of the orientation over time.

3. The apparatus of claim 2, wherein:
    the display surface is configured to display at least one touch-sensitive graphical element based on at least one of the determined orientation and the determined rate of change.

4. The apparatus of claim 1, further comprising:
    at least one microphone disposed within the housing, the microphone coupled to the processor and configured to receive aural control input from the operator.

5. The apparatus of claim 1, wherein:
    the processor is configured to generate the at least one holographic model when the processor has positively identified the target object; and
    the display surface is configured to superimpose the holographic model over the captured image stream by displaying at least one of:
        a) an adjustable surface guide corresponding to the surface;
        b) an adjustable edge guide corresponding to the edge; and
        c) an adjustable vertex guide corresponding to the vertex.

6. The apparatus of claim 5, wherein adjusting the holographic model includes at least one of:
    moving at least one of the adjustable vertex guide, the adjustable surface guide, and the adjustable edge guide;
    resizing at least one of the adjustable vertex guide, the adjustable surface guide, and the adjustable edge guide; and
    adjusting the holographic model relative to the captured image stream.

7. The apparatus of claim 1, wherein the processor is configured to determine the at least one dimension to a confidence level, the confidence level based on a plurality of measurements of the holographic model.

8. The apparatus of claim 1, further comprising:
    at least one memory coupled to the processor, the memory configured to store reference data associated with the target object.

9. The apparatus of claim 8, wherein the processor is configured to:
    generate supplemental object data corresponding to the target object; and
    add the supplemental object data to the acquired object data.

10. The apparatus of claim 9, wherein the processor is configured to upload the supplemental object data to the remote source via the wireless link.

11. The apparatus of claim 9, wherein the processor is configured to generate the supplemental object data by comparing at least one of the determined dimension and the object data to the reference data.

12. The apparatus of claim 1, wherein the processor is configured to acquire the object data by:
identifying at least one three-dimensional (3D) code based on the 3D image data;
and
decoding the 3D code.

13. A system for remote volume dimensioning via sensor fusion, comprising:
a mobile computing device capable of being carried by an operator, the mobile computing device comprising:
at least one two-dimensional (2D) image sensor configured to capture at least one image stream corresponding to a field of view (FOV), the FOV including at least one target object;
at least one three-dimensional (3D) imager configured to generate 3D image data associated with the FOV, the 3D image data including at least one plurality of points associated with the target object, each corresponding to a coordinate set and a distance from the apparatus;
at least one processor disposed within the housing and operatively coupled to the 2D image sensor and the 3D imager, the processor configured to:
a) distinguish the target object within the FOV by analyzing at least one of the captured image stream and the 3D image data;
b) generate at least one holographic model corresponding to the target object by correlating the 3D image data and the captured image stream, the holographic model including at least one of a surface of the target object, a vertex of the target object, and an edge of the target object;
c) determine at least one dimension of the target object by measuring the holographic model;
d) detect at least one object identifier corresponding to the target object by analyzing the holographic model;
and
e) acquire object data corresponding to the target object by decoding the object identifier;
and
at least one wireless transceiver disposed within the housing and configured to establish a wireless link;
and
at least one augmented reality (AR) viewing device communicatively coupled to the mobile computing device via wireless link and wearable by a viewer, the AR viewing device configured to:
a) display the captured image stream to the viewer via a display surface proximate to one or more eyes of the viewer;
b) superimpose the holographic model over the captured image stream;
c) detect control input provided by the viewer;
and
d) adjust the holographic model based on the detected control input.

14. The volume dimensioning system of claim 13, wherein the viewer is located remotely from the mobile computing device.

15. The volume dimensioning system of claim 13, wherein the AR viewing device includes at least one of:
a camera configured to detect a gesture of the viewer;
and
a microphone configured to detect aural control input provided by the viewer.

16. The volume dimensioning system of claim 13, wherein the AR viewing device includes at least one of a virtual reality (VR) viewing device and a mixed reality (MR) viewing device.

17. The volume dimensioning system of claim 13, wherein:
the wireless transceiver is configured to receive the detected control input via the wireless link;
and
the processor is configured to adjust the holographic model based on the received control input.

18. The volume dimensioning system of claim 13, wherein:
the processor is configured to generate the at least one holographic model when the processor has positively identified the target object;
and
the display surface is configured to superimpose the holographic model over the captured image stream by displaying at least one of:
a) an adjustable surface guide corresponding to the surface;
b) an adjustable edge guide corresponding to the edge;
and
c) an adjustable vertex guide corresponding to the vertex.

19. The volume dimensioning system of claim 18, wherein adjusting the holographic model includes at least one of:
moving at least one of the adjustable surface guide, the adjustable vertex guide, and the adjustable edge guide;
resizing at least one of the adjustable surface guide, the adjustable vertex guide, and the adjustable edge guide;
and
adjusting the holographic model relative to the captured image stream.

20. A method for volume dimensioning via sensor fusion, comprising:
capturing, via a two-dimensional (2D) camera attached to a mobile device, a 2D image stream corresponding to a field of view (FOV) and including at least one target object within the FOV;
capturing, via a three-dimensional (3D) imager attached to the mobile device, 3D image data corresponding to the FOV, the 3D image data including a plurality of points corresponding to the target object, each point comprising a coordinate set and a distance from the mobile device;
distinguishing, via at least one processor of the mobile device, the target object from the FOV by analyzing at least one of the captured image stream and the 3D image data;
generating, via at least one processor of the mobile device, a holographic model corresponding to the target object by correlating the 2D image stream and the plurality of points, the holographic model including at least one of a surface of the target object, an edge of the target object, and a vertex of the target object;
determining, via the processor, at least one dimension of the target object by measuring the holographic model;

detecting, via the processor, at least one object identifier corresponding to the target object by analyzing the holographic model; and
acquiring object data corresponding to the target object by decoding the object identifier.

\* \* \* \* \*